United States Patent
Yoo

(10) Patent No.: US 9,556,808 B2
(45) Date of Patent: Jan. 31, 2017

(54) IDLE STOP CONDITION DETERMINATION METHOD OF ENGINE

(71) Applicant: Hyundai Motor Company, Seoul (KR)

(72) Inventor: Jae Woong Yoo, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 445 days.

(21) Appl. No.: 14/137,596

(22) Filed: Dec. 20, 2013

(65) Prior Publication Data

US 2015/0075491 A1 Mar. 19, 2015

(30) Foreign Application Priority Data

Sep. 16, 2013 (KR) .................. 10-2013-0111103

(51) Int. Cl.
| | |
|---|---|
| *F02M 3/08* | (2006.01) |
| *F02D 33/00* | (2006.01) |
| *F02N 11/08* | (2006.01) |
| *B60R 16/023* | (2006.01) |
| *G01F 9/02* | (2006.01) |
| *F02D 41/08* | (2006.01) |

(52) U.S. Cl.
CPC .............. *F02D 33/006* (2013.01); *F02M 3/08* (2013.01); *F02N 11/084* (2013.01); *F02N 11/0818* (2013.01); *B60R 16/0236* (2013.01); *F02D 41/08* (2013.01); *F02D 2200/0625* (2013.01); *F02N 2200/105* (2013.01); *F02N 2300/2006* (2013.01); *F02N 2300/2008* (2013.01); *G01F 9/023* (2013.01); *Y02T 10/48* (2013.01)

(58) Field of Classification Search
CPC .. F02N 11/0814; F02N 11/0818; F02D 41/08; F02D 33/006; G01F 9/023; B60R 16/0236
USPC .................. 123/179.4, 339.12; 701/112, 123
See application file for complete search history.

(56) References Cited

U.S. PATENT DOCUMENTS

| | | | | |
|---|---|---|---|---|
| 8,494,758 | B2* | 7/2013 | Ishikawa ................. | F02D 17/04 123/179.4 |
| 8,868,320 | B2* | 10/2014 | Anzawa .................. | F02D 17/04 123/179.4 |
| 9,228,554 | B2* | 1/2016 | Balzer ..................... | F02D 28/00 |
| 2004/0149246 | A1* | 8/2004 | Itoh ........................ | B60H 1/3208 123/179.4 |

(Continued)

FOREIGN PATENT DOCUMENTS

| | | |
|---|---|---|
| JP | 3294569 B2 | 6/2002 |
| JP | 2013-136288 A | 7/2013 |

(Continued)

*Primary Examiner* — Stephen K Cronin
*Assistant Examiner* — Joshua A Campbell
(74) *Attorney, Agent, or Firm* — Morgan, Lewis & Bockius LLP

(57) ABSTRACT

An idle stop condition determination method of an engine includes: calculating and storing a fuel saving estimation amount in idle stop of an engine on the basis of traveling information; calculating the amount of fuel consumption in restarting for restarting, when an idle stop condition of the engine is satisfied; comparing the magnitudes of the fuel saving estimation amount with the amount of fuel consumption in restarting, and stopping the engine in accordance with the result of the comparing; and restarting the engine, when a restarting condition of the engine is satisfied.

6 Claims, 5 Drawing Sheets

(56) References Cited

U.S. PATENT DOCUMENTS

| | | | |
|---|---|---|---|
| 2009/0055075 A1* | 2/2009 | Denis | F02N 11/0818 701/102 |
| 2010/0070131 A1* | 3/2010 | Carsten | B60W 30/18018 701/33.4 |
| 2010/0204902 A1* | 8/2010 | Kuroki | F02D 41/042 701/103 |
| 2011/0144891 A1* | 6/2011 | Nakamura | F02D 41/065 701/104 |
| 2012/0136553 A1* | 5/2012 | Takeuchi | F02N 11/0814 701/102 |
| 2012/0253633 A1* | 10/2012 | Anzawa | F02D 17/04 701/102 |
| 2012/0270701 A1* | 10/2012 | Christen | B60W 10/06 477/171 |
| 2013/0042832 A1* | 2/2013 | Park | F02N 5/04 123/179.22 |
| 2013/0191005 A1* | 7/2013 | Hrovat | F02N 11/0837 701/102 |
| 2015/0075491 A1* | 3/2015 | Yoo | F02M 3/08 123/339.12 |

FOREIGN PATENT DOCUMENTS

| | | |
|---|---|---|
| KR | 1020110052151 A | 5/2011 |
| KR | 1020120068578 A | 6/2012 |

\* cited by examiner

FIG. 5

$$\text{fm\_stop} = \frac{\text{Total idle engine stop time(t total)}}{\text{Total number of times of idle engine stop(n)}} \times \begin{array}{c}\text{Amount of fuel}\\\text{consumption in idling}\\\text{(g/t)}\end{array}$$

fm_start = amount of fuel consumption(traveling condition:temperature of coolant etc.)

IDLE STOP CONDITION DETERMINATION METHOD OF ENGINE

CROSS-REFERENCE TO RELATED APPLICATION

The present application claims priority of Korean Patent Application Number 10-2013-0111103 filed Sep. 16, 2013, the entire contents of which application is incorporated herein for all purposes by this reference.

BACKGROUND OF INVENTION

Field of Invention

The present invention relates to an idle stop condition determination method of an engine which reduces fuel consumption and the amount of an exhaust gas by determining whether to stop an engine or keep the engine idling, when a vehicle is in stop and the engine is idling.

Description of Related Art

A technology of reducing fuel in idling of an engine for reducing fuel that is consumed by an engine has been studied.

In particular, the idle stop control of an engine, a method of stopping an engine by stopping fuel injection when a vehicle is in stop and the engine is idling, can reduce unnecessary fuel consumption and the amount of an exhaust gas in idling.

Further, it is possible to restart a vehicle by restarting an engine, by sensing the operation of a transmission, a brake, or a clutch. Further, a condition that the temperature of a coolant circulating through an engine is within a predetermined temperature range (for example, 50 to 60° C.) should be satisfied in order to stop an engine in idling.

Further, although the fuel is saved in idle stop of an engine, when the engine is stopped and restarted for a short time, the amount of fuel saved in idle stop is larger than the amount of fuel consumed for restarting the engine, such that the effect of saving fuel can be reduced.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for an idle stop condition determination method of an engine having advantages of reducing the waste of fuel and improving the quality of an exhaust gas by performing idle stopping or not in accordance with the driving conditions, even if an engine satisfies an idle stop condition.

Various aspects of the present invention provide for an idle stop condition determination method of an engine, which includes: calculating and storing a fuel saving estimation amount in idle stop of an engine on the basis of traveling information; calculating the amount of fuel consumption in restarting for restarting, when an idle stop condition of the engine is satisfied; comparing the magnitudes of the fuel saving estimation amount with the amount of fuel consumption in restarting, and stopping the engine in accordance with the result of the comparing; and restarting the engine, when a restarting condition of the engine is satisfied.

The fuel saving estimation amount may be calculated by multiplying an idle stop estimation time, which is calculated by dividing the total time of idle stop of the engine by the total number of times of idle stop of the engine, by the amount of fuel consumption in idling.

The amount of fuel consumption in restarting may be the amount of fuel consumption for restarting the engine on the basis of the current traveling information.

The traveling information may be the temperature of a coolant circulating through the engine.

When it is determined that the fuel saving estimation amount is larger than the amount of fuel consumption in restarting, the engine may stop.

When it is determined that the fuel saving estimation amount is equal to or smaller than the amount of fuel consumption in restarting, the engine may keep idling.

An injector that injects fuel may be turned off, when the engine stops, and a start motor and the injector may be turned on, when the engine restarts.

According to various aspects of the present invention, it is possible to further reduce the waste of fuel and improve the quality of an exhaust gas by performing idle stop or not in accordance with traveling conditions, even if an engine satisfies an idle stop condition.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 shows expressions showing the amount of fuel consumption in idle stop of an exemplary engine and in restarting of the engine according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
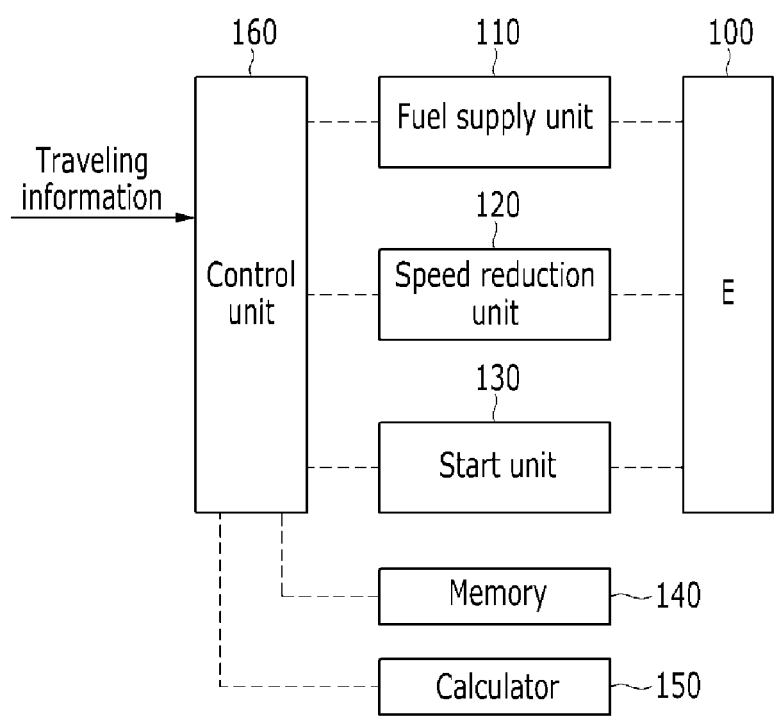
FIG. 1 is a schematic diagram of an exemplary engine system according to the present invention.

FIG. 1 is a schematic diagram of an engine system according to various embodiments of the present invention.

Referring to FIG. 1, an engine system includes an engine 100, a fuel supply unit 110, a speed reduction unit 120, a start unit 130, and a control unit 160, and the control unit 160 includes a memory 140 and a calculator 150. The memory 140 stores sensed or calculated information and the calculator 150 performs calculation according to various embodiments of the present invention.

The fuel supply unit 110 includes a fuel tank, a fuel pump, and an injector etc., in which the fuel tank stores fuel, the fuel pump pumps fuel, and the injector injects fuel.

The speed reduction unit 120 senses the speed of a vehicle through a speed sensor, the start unit 130 includes a battery and a start motor, and the start motor starts the engine, using electricity supplied from the battery.

The control unit 160 determines an idle stop condition of the engine 100 on the basis of the traveling information, such as the position of the brake pedal, the position of the acceleration pedal, the position of the transmission, and the temperature of the coolant, and the speed information of the vehicle, and stops fuel injection by controlling the injector of the fuel supply unit 110.

Further, when the driver's intention of starting is sensed on the basis of the traveling information, the control unit 160 starts the engine 100 by controlling the injector of the fuel supply unit 110 and the start unit 130.

In various embodiments of the present invention, the control unit 160 counts the number of times of idle stop of the engine, accumulates the idle stop time, and stores the fuel amount saved in idle stop on the memory.

Further, when the engine stops in idling, the control unit 160, on the basis of the total idle stop time, the total number of times of idle stop, and the amount of fuel injected in idling, can calculate an idle stop estimation time by dividing the total idle stop time of the engine 100 by the total number of times of idle stop of the engine 100, and can calculate and store a fuel saving estimation amount by multiplying the idle stop estimation time by the amount of fuel consumption in idling.

Figure 2:
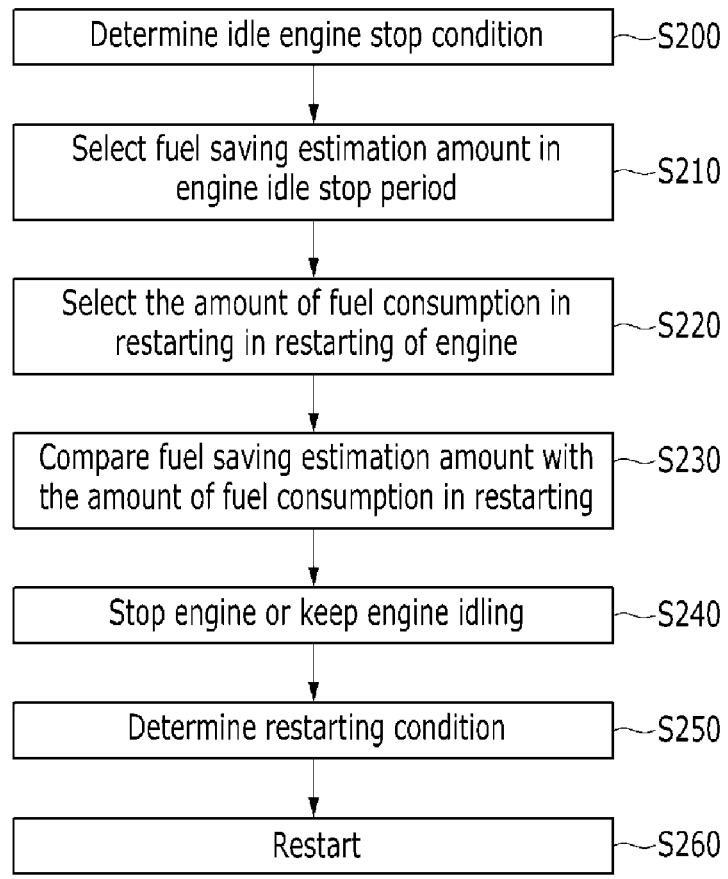
FIG. 2 is a flowchart schematically illustrating an exemplary idle stop condition determination method of an engine according to the present invention.

FIG. 2 is a flowchart schematically illustrating an idle stop condition determination method of an engine according to various embodiments of the present invention.

Referring to FIG. 1, the idle stop condition of the engine 100 is determined in S200. Determining the idle stop condition may depend on the temperature of the coolant, the shifting status, the vehicle speed, the position of the brake pedal, and the position of the clutch pedal etc.

The fuel saving estimation amount in the engine idle stop period is calculated (selected) in S210. The fuel saving estimation amount can be calculated by estimating the engine idle stop period, using the total period of engine idle stop and the total number of times of engine idle stop, which are stored in advance, and multiplying the engine idle stop period by the amount of fuel consumption in idling of the engine.

Further, the amount of fuel consumption in restarting is calculated in restarting of the engine 100 in S220. The amount of fuel consumption in restarting may be selected from map data set in advance on the basis of the traveling information such as the temperature of the coolant.

The fuel saving estimation amount and the amount of fuel consumption in restarting are compared in S230 and the engine 100 is stopped or kept idling in accordance with the compared data in S240.

When the engine 100 is in idle stop, whether the restarting condition of the engine 100 is satisfied is determined in S250 and the engine 100 is restarted in S260.

Figure 3:
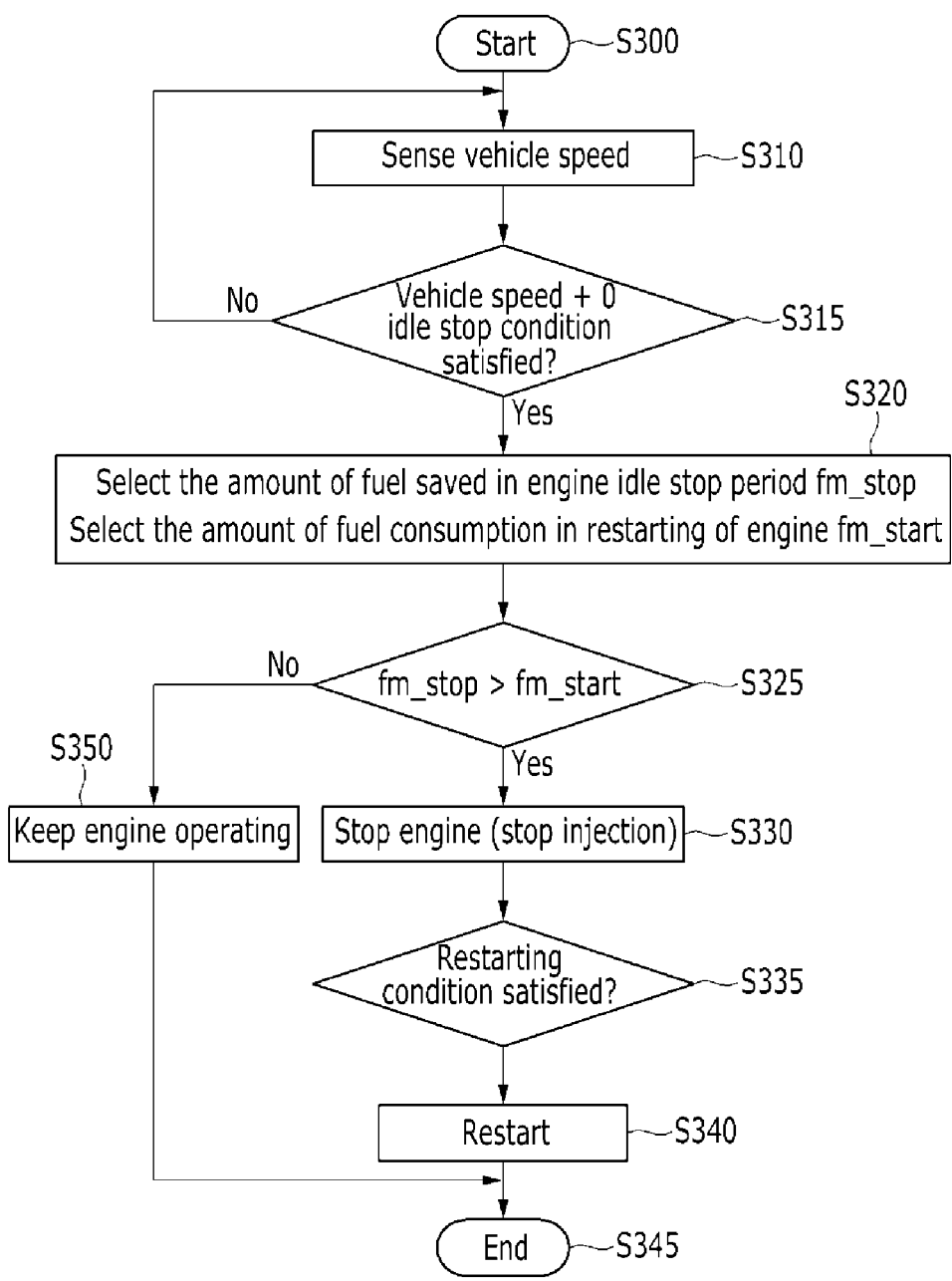
FIG. 3 is a flowchart illustrating an exemplary idle stop condition determination method of an engine according to the present invention.

FIG. 3 is a flowchart illustrating an idle stop condition determination method of an engine according to various embodiments of the present invention.

Referring to FIG. 3, control starts in S300, the vehicle speed is sensed in S310, and whether the vehicle speed is zero and the idle stop condition of the engine is satisfied are determined in S315. When the condition is not satisfied, the process returns to S310, and when the condition is satisfied, S320 is performed.

In S320, the fuel saving amount fm_stop (fuel saving estimation amount) in the idle stop period of the engine 100 is calculated or selected and the amount of fuel consumption fm_start in restarting of the engine (the amount of fuel consumption in restarting) is calculated or selected.

Further, the fuel saving estimation amount and the amount of fuel consumption in restarting are compared in S325, and then when the fuel saving estimation amount is larger than the amount of fuel consumption in restarting, S330 is performed, or if it is not, S350 is performed.

The engine 100 is stopped by stopping fuel injection in S330, and when the restarting condition is satisfied in S335, the engine 100 is restarted in S340. The engine 100 keeps idling in S350 and the control is ended in S345.

Figure 4:
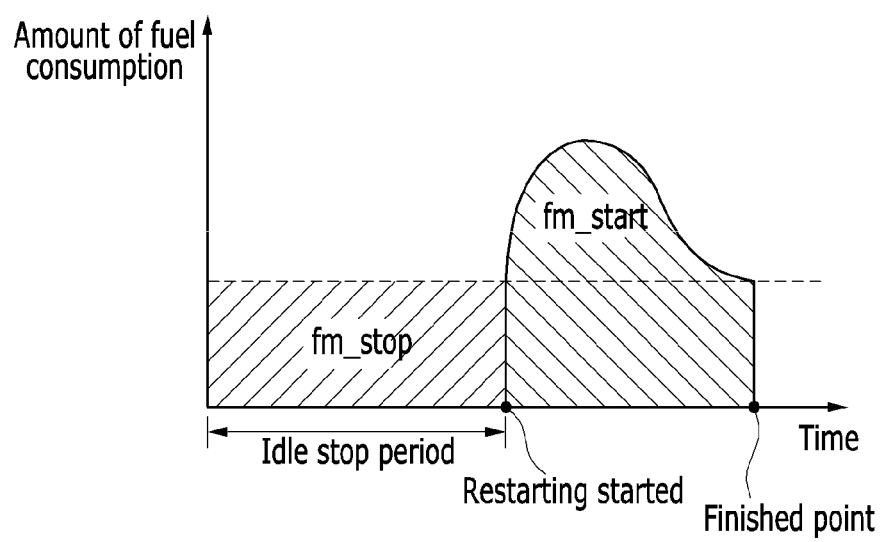
FIG. 4 is a graph showing the amount of fuel consumption in an idle stop period of an engine and a restart period of an exemplary engine according to the present invention.

FIG. 4 is a graph showing the amount of fuel consumption in an idle stop period of an engine and a restart period of the engine according to various embodiments of the present invention.

The horizontal axis is time and the vertical axis is the amount of fuel consumption. The fuel saving estimation amount fm_stop is saved in the actual idle stop period and the amount of fuel consumption in restarting fm_start is consumed in the restarting period.

In various embodiments of the present invention, it is possible to further reduce fuel consumption and prevent frequent idle stop by stopping the engine 100 in idling in accordance with the magnitude of the fuel saving estimation amount and the amount of fuel consumption in restarting.

FIG. 5 shows expressions showing the amount of fuel consumption in idle stop of an engine and in restarting of the engine according to various embodiments of the present invention.

Referring to FIG. 5, the fuel saving estimation amount fm stop is calculated by dividing the total engine idle stop time by the total number of times of engine idle stop and multiplying the resultant value of the dividing by the amount of fuel consumption in idling, and the result is stored on the memory.

Further, the amount of fuel consumption in restarting fm_start is selected from map data set in advance in accordance with the traveling conditions. For example, the amount of fuel consumption in restarting may be selected from map data based on the temperature of the coolant.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An idle stop condition determination method of an engine performed with a control unit having a calculator and a memory, comprising;

calculating a fuel saving estimation amount, with the calculator, in idle stop of an engine on the basis of traveling information, and storing the fuel saving estimation in the memory;

calculating an amount of fuel consumption required for restarting the engine, when an idle stop condition of the engine is satisfied;

comparing magnitudes of the fuel saving estimation amount with the amount of fuel consumption required for the restarting, and stopping the engine in accordance with a result of the comparing; and restarting the engine, when a restarting condition of the engine is satisfied, wherein the fuel saving estimation amount is calculated by multiplying an idle stop estimation time, which is calculated by dividing the total time of idle stop of the engine by the total number of times of idle stop of the engine, by the amount of fuel consumption in idling.

2. The method of claim 1, wherein the amount of fuel consumption in restarting is the amount of fuel consumption for restarting the engine on the basis of the current traveling information.

3. The method of claim 2, wherein the traveling information is the temperature of a coolant circulating through the engine.

4. The method of claim 1, wherein when it is determined that the fuel saving estimation amount is larger than the amount of fuel consumption required for the restarting, the engine stops.

5. The method of claim 1, wherein when it is determined that the fuel saving estimation amount is equal to or smaller than the amount of fuel consumption required for the restarting, the engine keeps idling.

6. The method of claim 1, wherein an injector that injects fuel is turned off, when the engine stops, and a start motor and the injector are turned on, when the engine restarts.

* * * * *